United States Patent [19]

Kim et al.

[11] Patent Number: 5,105,467
[45] Date of Patent: Apr. 14, 1992

[54] METHOD OF FINGERPRINT VERIFICATION

[76] Inventors: Bong Il Kim, 140-2 Waryong-Dong Chongro-Gu; Mun Kyu Kim, 3-602 Woosung Apt Bon-Dong Chamsil Kangdong-Gu; Young Kyong An, 2-1103 Samik Apt 869 Dogok-Dong Kangham-Gu; Jae Yeon Lee, 347-44 Dohwa-Dong Mapo-Gu, all of Seoul; Sang Sun Lee, 653-13 Naison-Dong Euiwang-Shi, Kyungki-Do; Hwang Jae Lee, 305-106 Leemun-Dong Dongdaemun-Gu, Seoul; Yun Seok Lee, 3-306 Kumgang Villa 64-3 Pyungchang-Dong Chongro-Gu, Seoul; Man Hee Kim, 54-306 Youngdong Apt Yeoksam 2-Dong Kangnam-Gu, Seoul; Ki Hyuk Chung, 217-504 Jugong Apt Wonmun-Dong Kwacheon-Shi, Kyungki-Do; Nam Cheon Kang, 23/5 144-14 Shindang 5-Dong Jung-Gu, Seoul; Sun Pyo Hong, 203 Yongshin Yeonrip 378 Jangan 1-Dong Dongdaemun-Gu, Seoul; Jung Ho Choi, 5-307 Solak Apt 433 Chamwon-Dong Seocho-Gu, Seoul, all of Rep. of Korea

[21] Appl. No.: 618,299

[22] Filed: Nov. 27, 1990

[30] Foreign Application Priority Data

Nov. 28, 1989 [KR] Rep. of Korea ............... 17357

[51] Int. Cl.$^5$ ............................................ G06K 9/00
[52] U.S. Cl. ................................... 382/4; 582/2; 582/5
[58] Field of Search ................... 382/2, 4, 5, 30, 34; 356/71

[56] References Cited

U.S. PATENT DOCUMENTS

| | | | |
|---|---|---|---|
| 4,151,512 | 4/1979 | Riganati et al. | 382/5 |
| 4,696,046 | 9/1987 | Schiller | 382/5 |
| 4,811,414 | 3/1989 | Fishbine et al. | 382/5 |
| 4,817,183 | 3/1989 | Sparrow | 382/5 |

Primary Examiner—David K. Moore
Assistant Examiner—Jose L. Couso
Attorney, Agent, or Firm—Darby & Darby

[57] ABSTRACT

A method of fingerprint verification includes determining a direction difference between a direction pattern of an input fingerprint and a direction pattern of a registered fingerprint and comparing the determined direction difference with predetermined upper and lower threshold values. The input and registered fingerprints are considered the same if the direction difference is lower than the lower threshold value, and the input and registered fingerprints are considered to be different if the direction difference is higher than the upper threshold value. If the direction different is between the upper and lower threshold values, minutiae of the input and registered fingerprints are extracted for verifying the input fingerprint. The extracting includes preprocessing of the input fingerprint image, uniboundary extraction of the input fingerprint minutiae, and restoration to eliminate pseudo-minutiae.

7 Claims, 8 Drawing Sheets

4 DIRECTION FIGURE

| X4 | X3 | X2 |
| --- | --- | --- |
| X5 | X0 | X1 |
| X6 | X7 | X8 |

R R Pair

FIG. 13(B)

B B Pair     R B Pair

METHOD OF FINGERPRINT VERIFICATION

FIELD OF THE INVENTION

This invention relates to a fingerprint verification method for comparing entered and registered fingerprints and identifying the direction pattern and the locations of minutiae (ridge endings and bifurcations).

BACKGROUND OF THE INVENTION

The well-known system for fingerprint recognition usually identifies a fingerprint from multiples of registered fingerprints (Identification System) for criminal investigation of police. Therefore, this kind of system needs mainframes and takes a long time for processing. These problems make if difficult to apply the known methods to the one to one verification system which is the purpose of this invention. Even though there are approaches which introduce the high speed special purpose processor to cover the problem of processing speed, they result in cost increase of the consequent system.

This invention is to solve these problems, removing cost increase due to adding high speed processor and uses method of the maximization of the rate of process via S/W. In short, our invention aims at the reduction of processing time and plausibity in view of accuracy and practice of fingerprint verification.

DEFINITION OF REFERENCE NUMBER IN THE DRAWING

5. Input Unit
6. Processing Unit
7. Prism
8. Light Source (LED)
9. Camera
10. Display Device (LCD)
11. Key Pad
12. Diffraction Panel
13. Supporter
14. Image Grab Board
15. Main Processing Unit
16. External Port for RS-232C Communication

DETAILED DESCRIPTION OF THE PREFERRED EMBODIMENT

Figure 1:
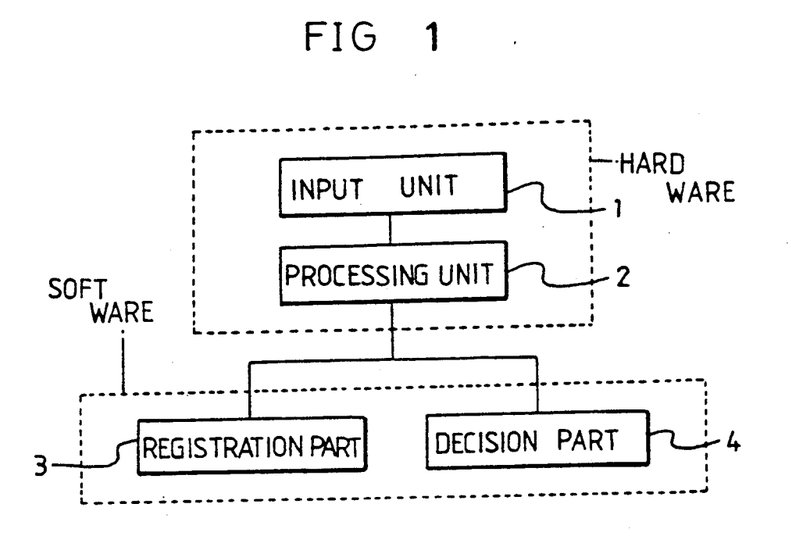
FIG. 1 is a global block diagram of software (S/W) and hardware (H/W) structure.

As shown in FIG. 1, H/W is composed of input unit (1), processing unit (2) and S/W is of registration part and decision part and fingerprint verification processing is performed sequentially.

Input unit (1) is composed of the part which transforms fingerprint image through the prism to digital signal possible to process and user interface.

Processing unit (2) extract the result of fingerprint verification decision by performing the S/W instructions to input image from input unit (1).

Figure 5:
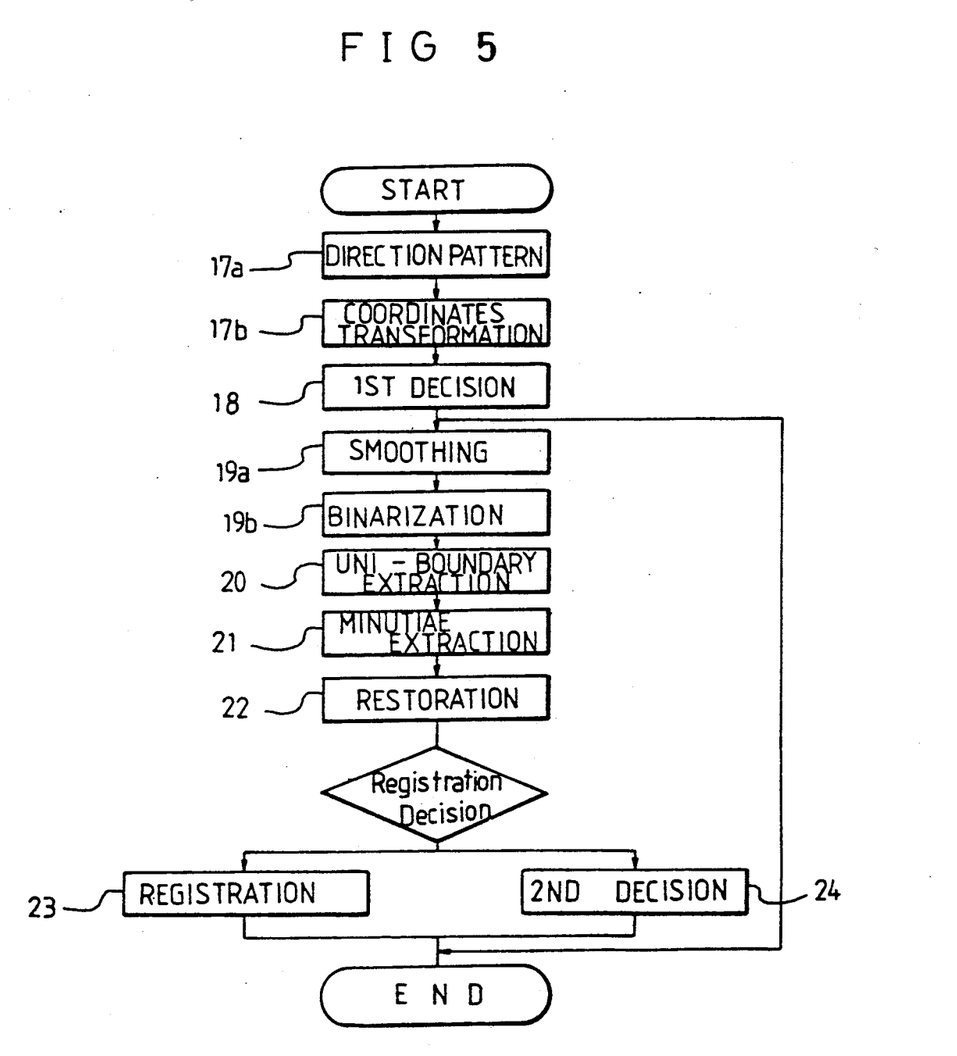
FIG. 5 is a flow chart for the S/W structure of FIG. 1.

Registration part follows the preprocessing as shown in FIG. 5 and stores the location of the minutiae, types (ridge endings or bifurcations), direction of the minutiae, direction pattern indicating distribution of ridge's average direction and unique ID number at specific memory location.

Matching part compares the features extracted from input image and registered ones, and decide whether they are the same or not.

Figure 2:
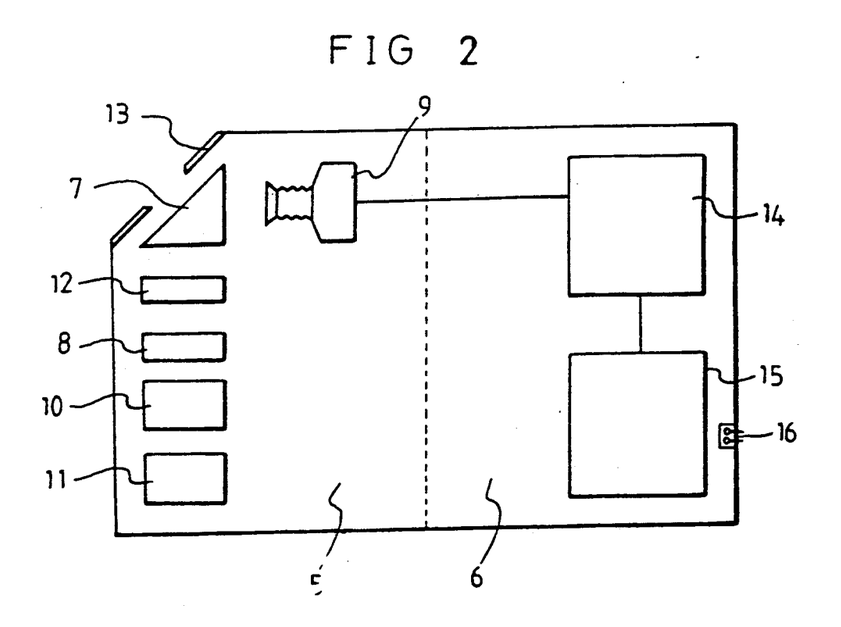
FIG. 2 illustrates detailed H/W structure.

As shown in FIG. 2 of input unit, finger guide is put out of input unit to get accurate finger print image by reducing its translational movement and prism is disposed outside of input unit to get fingerprint image.

To get homogeneous polorized light., 8×8 LED is arranged and between LED and prism diffraction panel is located. Fingerprint image is captured by CCD camera lens, which is placed at focal length, using the property of the refletion and absorption of the light. Because of total reflection of prism, at the slant edge of prism, the valley of fingerprint is seen bright and ridge of fingerprint is seen dark. CCD camera is located at Processing Unit and digitize the video output signal a 8 and 1/30 sec rate. And it transfer the data to image capturing part which convert the entire image to image of 256×256 pixels.

This converted digital image data is transferred to MPU and in turn MPU performs S/W intruction with this data.

ID number is sent to MPU through ten key. Then MPU displays the steps of processing such an input, registration and decision to let the user know the status of system.

Also there exists output port indicating result of decision to make control of outer switch be performed via MPU.

By logically separating MPU from ten key controller, operation of output display unit and the control output port, modularity of the system is conserved.

Figure 3:
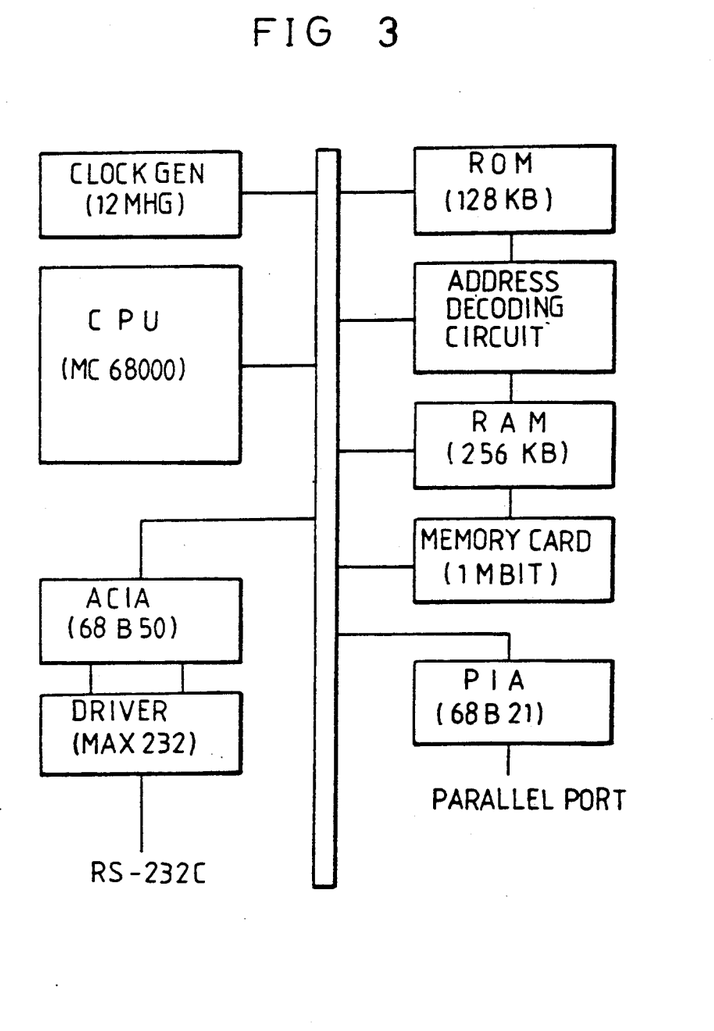
FIG. 3 is a detailed block diagram of the main processing unit of FIG. 2.
Figure 4:
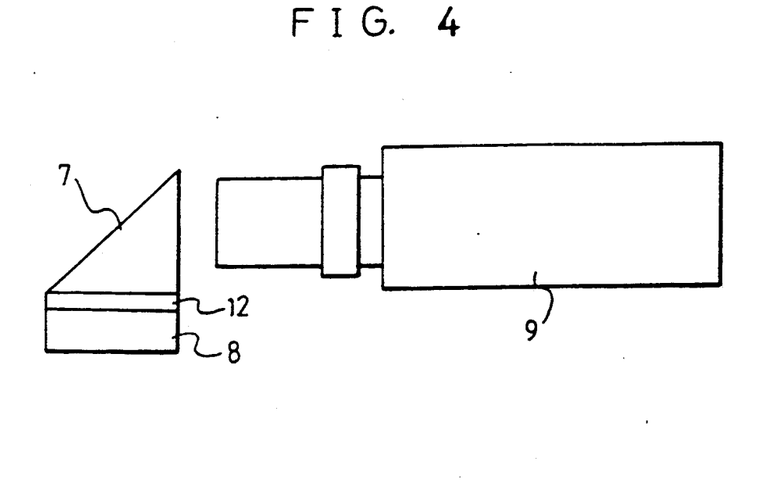
FIG. 4 illustrates a detailed input unit for fingerprints.

Processing unit is composed of MPU and Image Capturing Part. The MPU used MC68000 for CPU, operates above the frequency of 12 MHz and it has a auxiliary processor and a switch for outer connection. An auxiliary processor, 6850 and 6821 are used for the operations of asynchronous communication interface adapter and peripheral interface adapter.

. ACIA, conneted to host computer, is used to transfer informations if necessary.

PIA is used for 2 purposes. One of them is to interpretate the input from user who key in ID or other commands and make to LCD work by MPU command. The other one is to be connected to Image Capturing Part and to control the time of writing input image to memory.

Figure 6A:
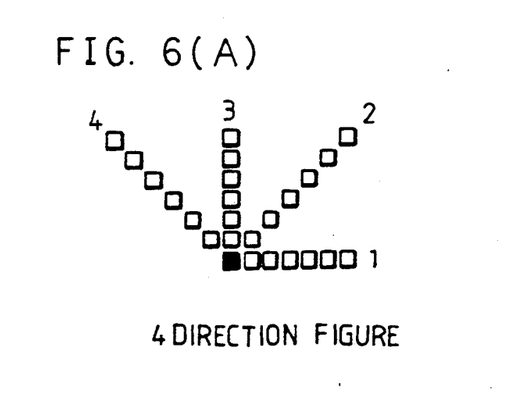
FIGS. 6A and 6B illustrate a direction mask and its structure.
Figure 6B:
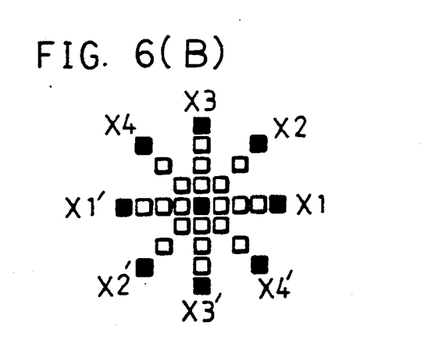

FIG. 5 illustrates the data processing of S/W as follows:

Direction pattern is extracted as shown in FIG. 6(A) by using circular mask in FIG. 6(B) and deciding one of 4 possible directions for the each pixels of considered region.

If we find maximum of sums of grey level difference between two pixels which are located at the ends of 4 possible diagonal and the centered pixel (Xo) of the circular mask, then we can decide direction of centered pixel as the direction perpendicular to diagonal direction.

In other words, in order to get the direction pattern of ridge for fingerprint which is expressed as image of 256×256 or less, a centered pixel (Xo) is chosen by using 3×3 windows and moving it up or down and to the left and right.

Figure 7A:
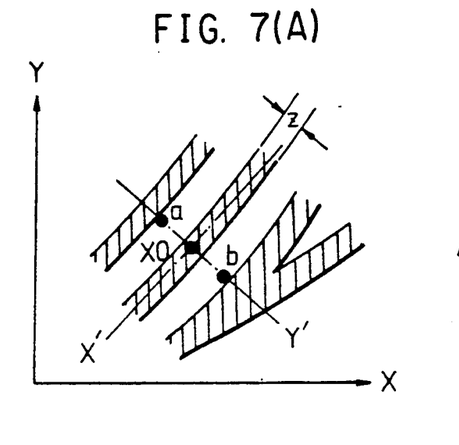
FIGS. 7A and 7B are an illustration of a direction pattern.

In (A) of FIG. 7, since center pixel XO is a point on the ridge of fingerprint, pixels at both sides of XO i.e. both ending pixels (a), (b) are points on the valley of fingerprint.

The ridge of fingerprint is displaced as black pixel and the valley of fingerprint as white pixel. Since both ending pixels (a), (b) on the diagonal should be located at the valley part when the center pixel on the window is located at the ridge part, the length between both ending pixels (a) and (b) should be determined little bit shorter than two times of ridge width on the diagonal y'. If we find direction which maximize the sum of differences of gray level value of both ending pixels (a), (b) and xO when they are on the diagonal y', we can determine the direction of pixel XO as perpendicular direction X' to the diagonal direction.

Brief explanation is shown as follows:

(i) Let window allign the region for direction extraction and for center pixel XO of window find the difference D of two pixels which are located on the diagonal of 4 directions (n=1,2,3,4)

$$DN=(Xn-X0)+(Xn'-X0), n=(1,2,3,4)$$

(ii) Find n which maximizes D. The direction of pixel XO is determined as the perpendicular to n. Following the same procedure, obtain the direction distribution of all the pixels in a region.

Figure 7B:
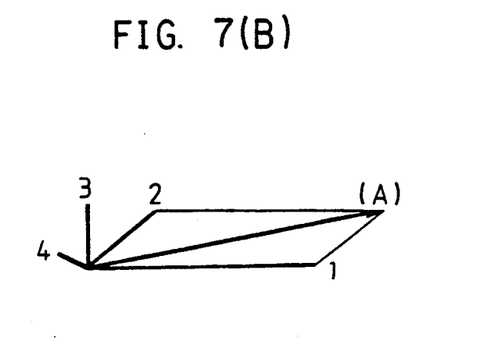

(iii) The region direction (A) as in FIG. 7. (B) is determined by summing the vectors of the biggest one and the bigger of its adjacent ones.

By following this direction pattern extraction method, the direction pattern of pre-registered and input fingerprint images can be obtained. Note that though the image of same fingerprint is entered, direction differences can be occurred because of different input image condition and its transitions from registered one.

To compensate this transition, coordinate transformation (17b) is to be executed. General coordinate transformation method is to determine the center and axis of fingerprint and to concide coordinates but the method using the relation of minutiae is used for this invention.

The coordinate transformation method (17b) of this invention uses the fact that direction difference of two direction pattern is minimized when the coordinate of two images coincide with.

To begin with, overlap the direction pattern of registerd and input fingerprints and obtain direction difference of overlapped region.

Figure 8:
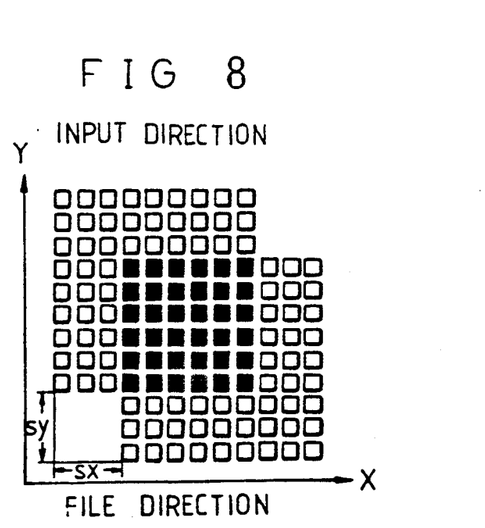
FIG. 8 is an illustration of a change of coordinates.

As seen in FIG. 8., if the input fingerprint image shifts to Sx in the horizontal diretion and Sy in the vertical direction and the direction difference is minumum, it can be said that direction patterns of two fingerprints are the most approximate and the location shift of two images occurs Sx and Sy for each direction. Therefore coordinates transformation for input fingerprint image is to compensate coordinate displaycements Sx and Sy for each direction and to shift direction pattern so as to be the most approximate direction pattern. This expression is shown in following equation.

X coordinate of registered fingerprint=X coordinate of input fingerprint+Sx

Y coordinate of registered fingerprint=Y coordinate of input fingerprint+Sy

The first decision (18) is a process to determine whether registered and input fingerprints are the same or not by using minimum direction difference. At this process, two threshold values are needed.

First, the direction pattern of registered and input fingerprint should be obtained and coordinate-transformed.

Next, from the fact that same fingerprints have small direction differences and different ones have large direction difference, A pair of fingerprints are regarded as different ones if their direction difference is higher than upper-threshold value. Likewise, they are regarded as different ones if their direction difference is lower than lower-threshold. And then, first decision process will be complete and the whole process will be over. But if direction difference lies between two threshold value, the decision will be vague and the second decision (24) process which use minutiae for decision will be continued.

The experiment using these processes shows that it is possible to make a decision at the rate of 46.02% for acceptance of same fingerprints and 83.39% for rejection of different fingerprints. If the first decision is accomplished, the result will be reported to external output device and the whole process will be finished.

Therefore it can finish process within 3 seconds for the cases of equivalent to rate of experimental result.

Since input image is corrupted by noise due to dust, moisture and condition of prism and it is hard to extract minutiae directly from input image because of its vast amount of gray level data, a pocess called preprocessing is necessary to get necessary information by removing noise and reducing the amount of data. And it has following procedure.

At the first step, smoothing is to replace the gray level of a specific pixel with the average of all the pixels of fixed size window. In short, to get the smoothed value of a pixel, for 3×3 window shown FIG. 9 XO is smoothed by using the equation, $$XO=\Sigma(Xi)/9 \ (i=0 \ldots 8)$$

Figure 9:
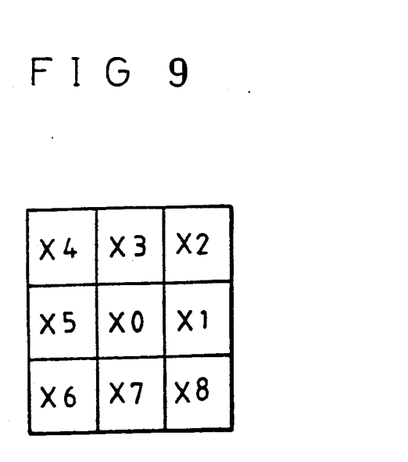
FIG. 9 illustrates a 3×3 window for a smoothing operation.

And the same procedure is performed for the rest of pixels of image to removed effect of noise.

The second step in preprocessing (19), Binarization is a step to discriminate between ridge and valley part and set each pixel value of gray level to one of two values, 0 or 1. For fingerprint image, because the average pixel value in the whole image region is not uniform, by considering this characteristic of fingerprint binarization processing using circular mask window is executed. This process includes process that discriminate between fingerprint region and background region and assign 1 value for pixel whose value is higher than given threshold value, 0 value for pixel whose value is lower than given one.

Next is a similar extraction process. A process making line image i.e. process making line image with one pixel width, should precede in order to make it easy to extract minutae. Since fingerprint has form and characteristic of line image, line image of fingerprint is also expected to be suitable for extraction of minutae.

Hitherto, thinning is frequently used to extract line image, but it has a disadvantage of making real time processing hard. Therefore, with an eye on processing time, the method suitable for minutae extraction in real time is necessary. So to meet this necessity, uniboundary extraction method is developed and used in our invention.

Uniboundary extraction only requires about one thirtieth time of that of thinning and improves processing time, which is a advantage of our invention.

Uniboundary extraction procedure is explained as follows.

Figure 10:
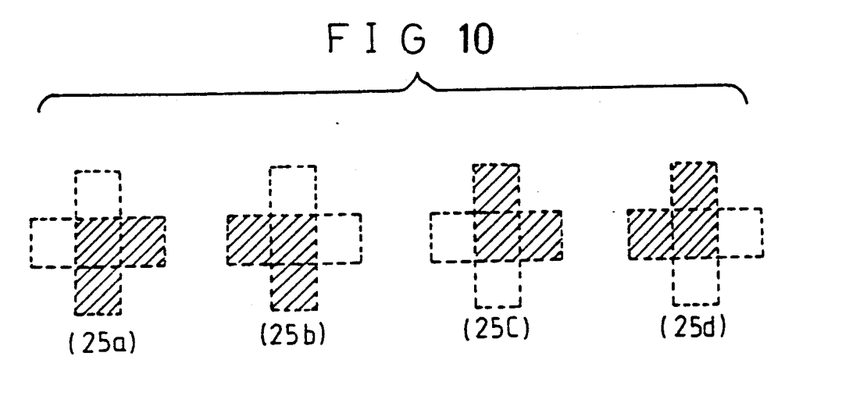
FIG. 10 shows four combinations of pixels for boundary detection.

Since fingerprint direction consists of 4 direction components, i.e. upper left, upper right, lower left and lower right, direction of boundary pixel can be determined by investigating 4 direction components as shown in FIG. 10. Boundary direction of fingerprit can be expressed as one of 4 direction components.

Figure 11:
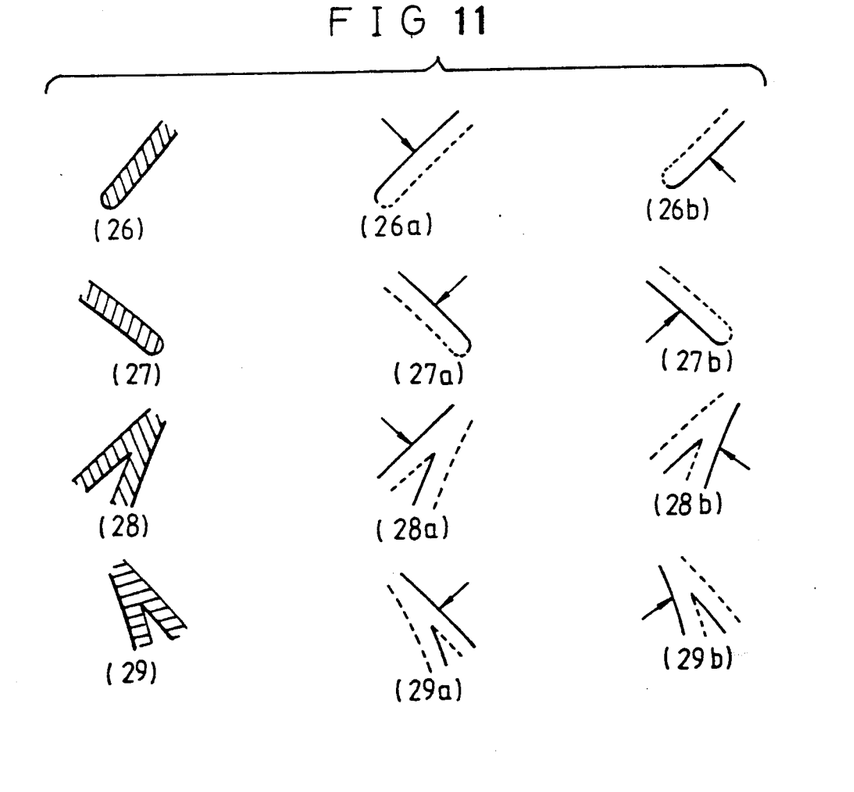
FIG. 11 shows examples of extracting uniboundaries from a fingerprint image.

After uniboundary processing, shapes of ending points as (26a), (26b), (27a) and (27b) in FIG. 11 become very similar and extraction locations of minutiae do. Similarly shapes and extraction location of bifurcation show similar results. So any combination except for diagonal direction has very similar boundary pattern. In conclusion, when we extract direction pattern of ridge from fingerprint, we can fully express fingerprint shape using only one of 4 uniboundary image which consists of direction components (25a) and (25b), (25b) and (25d) (25c) and (25d) or (25a) and (25c).

In each case, there is no large difference in expressing shape of fingerprint.

In our invention, after dividing the whole image into fixed regions, we calculate the number of pixels corresponding to each direction in order to determine which direction is more valid for each pixel on the boundary. And we extract uniboundary of the region by using its direction which corresponds to more pixels than any others does.

Note that after the uniboundary extraction of image, the thinned image has only form of the ending regardless of ending or bifurcation.

Therefore if we calculate xi's (i=1. . 3) around x0 circularly using simple 3×3 window such as FIG. 9, we can extract the minutiae by looking the pixel whose value is either Cn=2 or Bn=1 which is used to transfer image pixel to background pixel or background to image pixel.

This procedure is explained in the following equations.

Figure 12A:
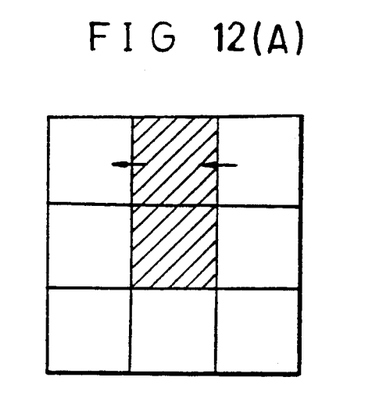
FIGS. 12A-B illustrates identification of an ending and a bifurcation using the uni-boundary method.
Figure 12B:
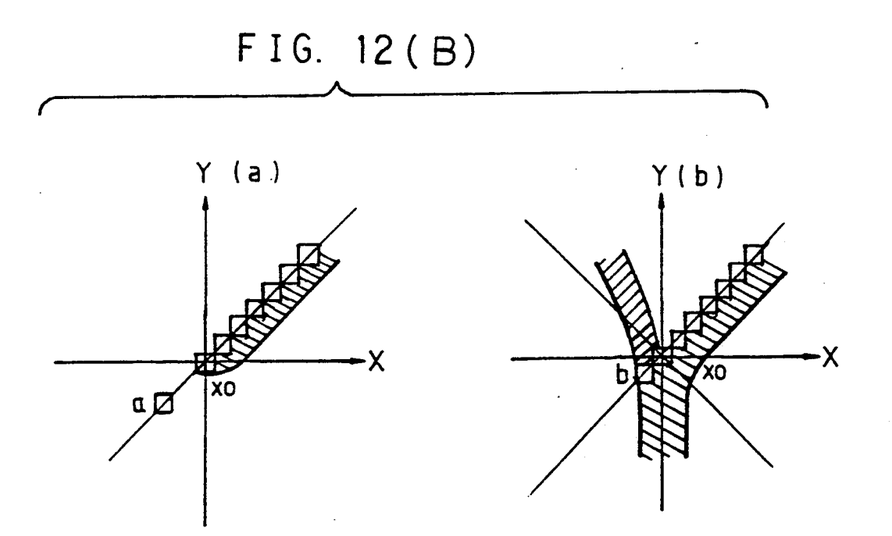

Connection Number: $Cn = \Sigma | X(i+1) - X(i) |$
Number of Ridge Pixels: $Bn = \Sigma X(i)$
$(i = 1, \ldots, 8)$ Also, to classify the type of a minutia, a pixel (a) or a pixel (b) which is on the extended line of uni-boundary from a minutia X is checked and the type is determined to be Ending (A) and Bifurcation (B) in case of ridge and valley pixel, respectively.

In this invention, type (Ending, Bifurcation), coordinate (x,y), and direction for a minutia are extracted and a fingerprint is verified by comparing minutiae of input fingerprint image with registered minutiae.

By the way, the consequent set of minutiae may contain pseudo minutiae or lose original information of the fingerprint because of the noise of original image and noise introduced in the stage of processing. The processing which eliminates pseudo-minutiae is called restoration (22).

In this invention, the method eliminating points which are regarded as pseudo minutiae in consideration of connection status and neighborhood, after the creation of line image, is adopted and a process which is suitable for the structure of fingerprint is chosen for restoration.

That is, pairs in critical distance are eliminated from 1st extracted minutiae list and then pairs whose distance is shorter than a threshold and with reverse direction (degree 180) are eliminated. In case that the state of input image is not so good, it eliminatea group of minutiae within a range of threshold distance for the rest of minutiae.

Figure 13A:
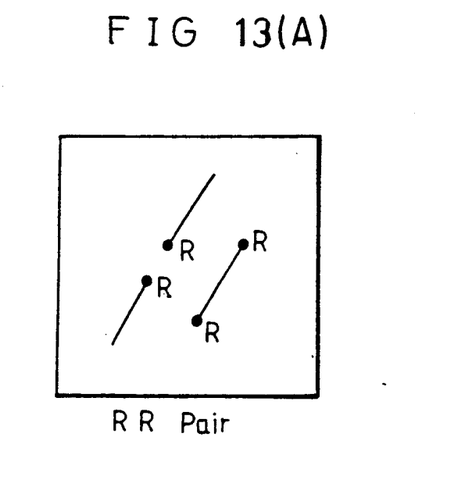
FIGS. 13A-B are useful in the explanation of removing peudo-minutiac in the restoration process.
Figure 13B:
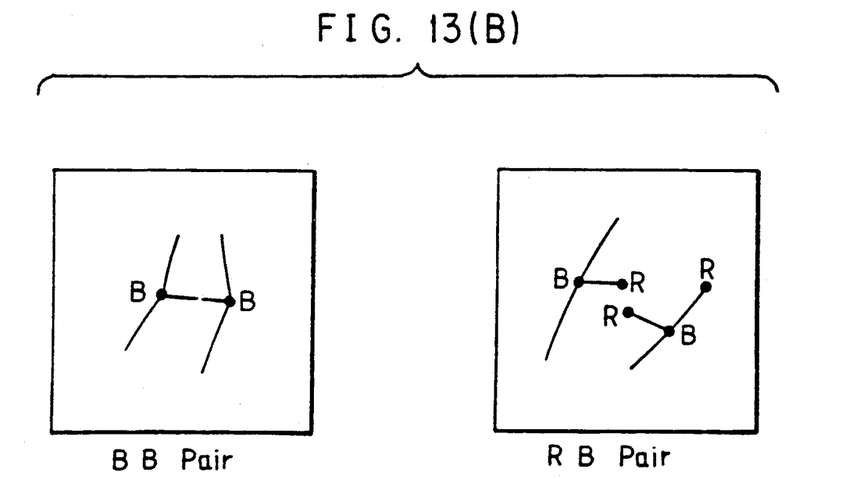

An example of pseudo minutiae pair to be eliminated is shown in FIG. 13. The characteristic information for input fingerprint image is extracted through the above mentioned processes; uni-boundary extraction (20), minutiae extraction (21) and restoration (22). Then a person is verified by comparison and decision for the similarity with registered minutiae.

But, if two images are grabbed respectively, one may be shifted and rotated for the other.

So the correction of translation may be needed before observing a correspondance between them. Since we have 1st decision phase by using a direction pattern table for fingerprint image, shift values obtained in that phase are used and it has lower complexity than others.

That is, we have the following processes. The coordinates of input minutiae list are translated according to registered minutiae list by using shift values obtained in direction pattern table extraction of FIG. 5. Then the similarity is measured. So it is a merit of this invention that a supplementary process for coordinate transformation is not necessary by using shift values obtained already and that simplifies a process for coordinate transformation.

Once the coordinate is compensated, match ratio which indicates the similarity between two images is calculated. The verification of fingerprint identity is performed according to a threshold value.

It is to get the similarity for every feature between input and registered minutiae.

In this case, a threshold value is chosen in consideration of distortion and error in preprocessing. The formulas for calculating match ratio are various, but as their purpose is to measure the similarity of input minutiae to registered ones, we calculate in the following formula.

$$\text{Match ratio} = \frac{2 * \text{matched pair}}{\text{Number of registered minutiae} + \text{Number of input minutiae}}$$

Here, if the match ratio is above a threshold, they are considered as the same fingerprints and if not, as different ones. The result is transferred to an external display, LCD(10). Then a decision process is completed and the verification process is finished. It may be very fatal in the verification system to judge a different fingerprint as the same. Therefore we adjust the Type II error to 0% that a different fingerprint is recognized as the same. In this case, the Type I error rate that the same fingerprint is classified as a different one is 4.23% according to experimental results.

In observation of fingerprint verification process, the 1st phase for decision which compares and judges with direction pattern tables of registered and input fingerprint has two threshold. And if the average difference between two direction pattern tables is above the upper threshold, the input fingerprint is judged to be a different one and if it is below the lower threshold, the input one is to be the same and the process is terminated. In 2nd phase for decision, preprocessing (19), uniboundary extraction (20) and restoration process (22) are performed to extract minutiae for input images of which average difference for direction patterns are between two thresholds mentioned above. Then the similarity to the registered fingerprint is measured to judge whether they are same or not. So this is a multi-stage method for fingerprint verification.

By this method with 1st and 2nd phases for decision, any one can be verified with only direction pattern table in 1st phase and so this improves the performance for verification. Typical methods for thinning which require a long processing time are replaced by the method "uni-boundary" that improves the processing speed by 1/30 of typical ones. Hence the additional digital signal processor for fast processing is not necessary So this invention can be implemented in low cost and it can gain high marks in view of economic practicality and performance.

What is claimed is:

1. A method of fingerprint verification comprising the steps of:
    determining a direction difference between a direction pattern of an input fingerprint of a person and a direction pattern of a registered fingerprint of the person;
    comparing the determined direction difference with predetermined upper and lower threshold values, the input and registered fingerprints being considered the same if the direction difference is lower than the lower threshold value, and the input and registered fingerprints being considered to be different if the direction difference is higher than the upper threshold value;
    thereafter, if the direction difference is between the upper and lower threshold values, extracting minutiae of the input and registered fingerprints for verifying the input fingerprint, the extracting step including preprocessing of the input fingerprint image to eliminate noise, uniboundary extraction of the input fingerprint minutiae, and restoration to eliminate pseudo-minutiae; and
    determining the match ratio of the input fingerprint minutiae and the registered fingerprint minutiae and comparing it with a predetermined threshold value.

2. A method as set forth in claim 1 wherein the determining step includes transformation of coordinates of the input fingerprint which comprises determining a direction difference of an overlapped region of the direction patterns of the input and registered fingerprints and determining shift values of the coordinates.

3. A method as set forth in claim 1 wherein the uniboundary extraction includes obtaining an uniboundary image by applying a pair of adjacent masks of a set of upper-left, upper-right, lower-left and lower-right masks.

4. A method as set forth in claim 1 wherein the extracting step includes obtaining pixel value of $Cn=2$ and $Bn=1$, wherein $Cn$ is a connection number and $Bn$ is a number of ridge pixels and $$Cn = \Sigma |X(i+1) - Xi| (i=1,\ldots 8)$$

$$Bn = \Sigma |Xi| (i=1,\ldots 8)$$

5. A method as set forth in claim 4 wherein the minutiae is characterized by coordinate (X,Y), an ending for a ridge pixel and a bifurcation for a valley pixel.

6. A method as set forth in claim 1 wherein the restoration includes eliminating nearest minutiae pairs with a predetermined threshold and eliminating near minutiae with reverse directions of approximately 180°.

7. A method as set forth in claim 1 wherein the determining step includes extracting the direction pattern of the input fingerprint by using a circular mask.

* * * * *